Nov. 9, 1948. L. R. TANSLEY 2,453,553
MEASURING VALVE MECHANISM
Filed July 28, 1944
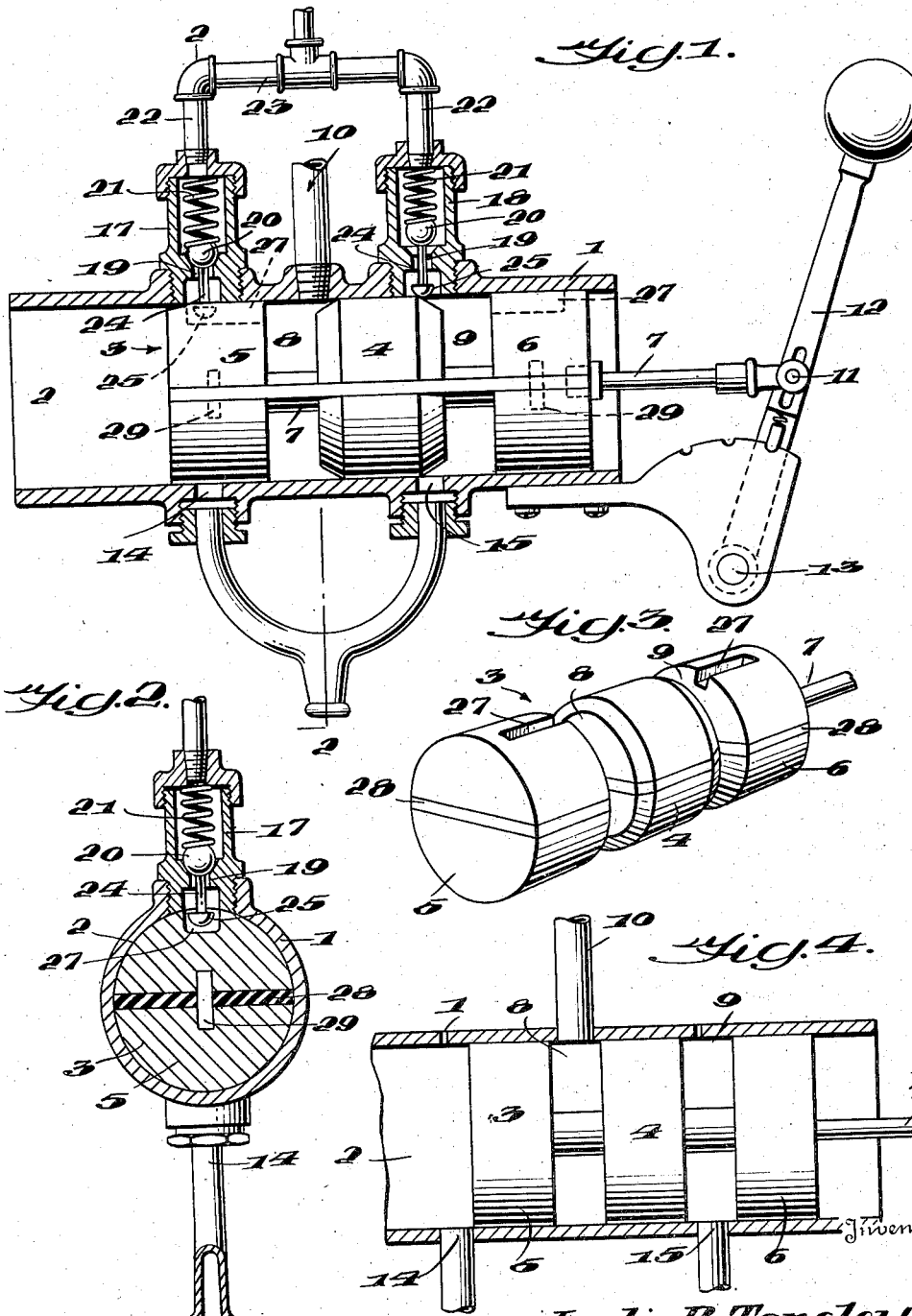

Patented Nov. 9, 1948

2,453,553

UNITED STATES PATENT OFFICE 2,453,553

MEASURING VALVE MECHANISM

Leslie R. Tansley, Columbus, Ohio

Application July 28, 1944, Serial No. 547,067

7 Claims. (Cl. 225—26)

This invention relates to improvements in measuring valves, and an object thereof is to provide a measuring valve by means of which a predetermined quantity of a fluid may be discharged from an associated outlet with each operation of the valve.

It is another object of the invention to provide a combined measuring and blending valve which, when the valve is operated, will deliver to an associated outlet a given amount of one fluid blended or combined with a controllable amount of another fluid.

While the valve comprising the present invention is adapted to the measured dispensing of many kinds of fluids, one of its principal uses resides in the dispensing of carbonated and similar beverages in which a flavoring sirup is used. In prior constructions, considerable difficulty has been encountered in providing a valve mechanism which in successive operations will deliver accurately a fixed or invariable quantity of the flavoring sirup or flavoring concentrate with the diluting water and, moreover, to accomplish the operations quickly and without loss of time.

It is, therefore, a further object of the invention to provide a double acting measuring valve employing a tubular casing in which is slidably mounted a spool-shaped piston having longitudinally spaced annular grooves, the latter, upon sliding movement of the piston, being selectively registered with a fluid inlet provided in the casing and with a pair of spaced outlets, so that when one of the said grooves is being filled with the fluid, the other groove will be in registration with one of the outlets and, upon the next succeeding operation, the fluid-filled groove will be brought into registration with the second of said outlets and the groove originally in registration with the first outlet will be brought into registration with the fluid inlet, allowing the same to be filled with a measured amount of the fluid and thereby rendered ready for re-registration with the first outlet.

Still, a further object of the invention is to provide such a valve with a pair of diluting fluid inlets in which normally closed spring pressed valves having actuating stems are provided, the stems of said valves being disposed for engagement with relieved surfaces provided on the center of the valve heads between the measuring grooves, so that, as the sirup or concentrate filled groove is advanced by the piston toward discharging position, the stem of one of the spring-pressed valves will be engaged by a relieved surface of the piston to unseat the valve and provide for the flow of the diluting fluid, blended with the sirup or concentrate, in one or the other of the outlets of the valve casing.

For a further understanding of the invention, reference is to be had to the following description and the accompanying drawing, wherein:

Fig. 1 is a vertical sectional view taken through a combined fluid measuring and blending valve mechanism formed in accordance with the present invention;

Fig. 2 is a transverse sectional view taken on the line 2—2 of Fig. 1;

Fig. 3 is a detail perspective view of the valve piston;

Fig. 4 is a vertical sectional view through a slightly further modified form of the valve mechanism.

Referring more particularly to the drawings, the numeral 1 designates the casing of my improved valve mechanism. The casing is formed with a cylindrical, open-ended piston chamber 2 in which is sildably mounted a valve piston 3. The piston comprises an intermediate head 4 and end heads 5 and 6 carried by a common axially disposed stem 7. The intermediate head 4 is spaced from the end heads 5 and 6 by annular measuring grooves 8 and 9 which, through reciprocation of the piston 3, are adapted to be selectively registered with a sirup or concentrate inlet indicated at 10, the latter leading to a suitable source of sirup or concentrate supply. This fluid may flow either under pressure or gravity to the valve casing. The stem 7 projects from one of the open ends of the chamber 2 and at its outer end is pivotally united as at 11 with a manually operated control lever 12 which, in turn, has its lower end pivoted as at 13 to the valve casing, or other equivalent supporting element.

When the lever 12 is in the position disclosed in Fig. 1, it will be noted that the measuring groove 8 is in registration with the inlet 10. This permits the sirup or concentrate to flow into and completely fill the groove 8 to its full volumetric capacity. When it is desired to dispense this quantity of the fluid, the piston is reciprocated, through the operation of the lever 12, until the groove 8 registers with the outlet indicated at 14, providing for the outflow of the measured quantity of fluid from the groove 8. When this operation takes place, the groove 9 of the piston valve will be brought into registration with the inlet 10, so that while fluid is being discharged from the groove 8, the groove 9 will be filled with the sirup or concentrate, in order that the valve will be in readiness for the succeeding operation.

When the groove 9 is so filled, the piston is reciprocated in the opposite direction, removing the groove 9 from registration with the inlet 10 and bringing it into registration with a second outlet 15, thus providing for the discharge of the fluid from the groove 9. The longitudinally spaced outlets 14 and 15 may, if desired, be merged into a common outlet neck 16.

When the mechanism is used as a blending valve, as in the dispensing of carbonated beverages, the casing 1 is provided with longitudinally spaced supplemental housings 17 and 18. Each of these housings is formed with a bore 19 which terminates at its upper end in a valve seat. Normally closing the seats are ball valves 20 or their equivalents, and coil springs 21 may be arranged within the housings 17 and 18 for engagement with the valves 20 to maintain positively said last-named valves in engagement with their seats. The housing 17 and 18 may be united with pipes 22 which may be merged as at 23 and connected with a common source of water supply, such as a tank containing carbonated water under pressure, or to any other equivalent supply source. The valves 20 are formed with depending stems 24 which terminate in rounded heads 25 which, when the valves are seated, project slightly into the piston chamber 2. The central head 4 of the valve piston has its side surfaces tapered or relieved for engagement with the heads 25.

Consideration will disclose that when the valve 3 is reciprocated in a direction to bring the groove 8 thereof into registration with the outlet 14, the movement of the piston will result in the engagement of one of the relieved surfaces thereof with the stem of the valve 20 positioned in the housing 17. This engagement results in the elevation of the valve in the housing 17, so that carbonated water, or other diluting fluid, may flow through and around the groove 8, flushing the sirup or concentrate from said last-named groove and merging with the sirup or concentrate for outflow through the outlet 14 and the spout neck 16. The end heads 5 and 6 of the valve piston are recessed as at 27 to receive the headed ends of the valve stems 24, so that the valves 20 may normally maintain positions of closure except when in contact with the relieved surfaces 26 of said piston. The same blending operation takes place when the piston 3 is reciprocated to bring the groove 9 thereof into registration with the outlet 15, the valve 20 in the housing 18 being unseated to permit of flow of the diluting fluid into the groove 9 and thence through the outlet 15.

To maintain firm engagement between the outer surfaces of the heads 4, 5 and 6 of the piston and the inner surfaces of the chamber 2, the said piston may be formed in two halves, an upper and a lower half, and between these halves, there may be inserted a strip 28 of rubber, or other elastic material. When this rubber strip is compressed to permit of the insertion of the piston into the chamber 2, it will be seen that the same exerts an outward pressure on the piston halves causing the same to maintain firm and positive engagement with the wall surfaces of the chamber 2 and thereby preventing fluid seepage through or between the contacting surfaces of the piston and the casing chamber. Dowel pins 29 are used in each end of the piston to prevent relative longitudinal displacement of the piston halves.

In view of the foregoing, it will be seen that the present invention provides a combined measuring and blending valve well suited for the rapid, accurate dispensing of such fluids as carbonated beverages. The arrangement of the annular grooves 8 and 9 in the piston 3 provides for a complete filling of these grooves with a sirup or flavoring concentrate, so that a known and definite amount of the sirup or flavoring concentrate will be delivered with each operation of the valve piston and, moreover, this operation is accomplished quickly and without any appreciable delay, a feature which enables carbonated beverages of the sirup-containing type to be dispensed with marked rapidity and without the usual delays of present and prior apparatus to allow filling of the single measuring chamber.

While I have mentioned my valve as being particularly useful in the dispensing of carbonated beverages, it will be understood that the same is not so limited in its practical aspects, as it may be employed in any capacity for the dispensing of fluids in measured quantities. For example, as shown in Fig. 4, the valve mechanism is the same as that set forth in Fig. 1, with the exception that the valved inlets for the diluting fluids have been eliminated and the construction simplified for the dispensing of but a single fluid, such as in the measurement of milk, cream, sirups and various other fluids.

By employing the split type of piston valve with intervening elastic material between the valve halves, the use of external sealing rings on the valve is eliminated, and the valve surfaces maintained in fluid-tight engagement with the walls of the valve chamber. Such sealing remains fluid-tight over prolonged periods of use, and admits of the employment of glass, plastics, metals and other materials in the construction of the valve mechanism. It is sometimes desirable to use a transparent material in the construction of the apparatus since it admits of visual inspection of the operation thereof.

While I have disclosed the secondary valves 20 as being operated by the movement of the main piston valve, it will be understood that other means may be used synchronously cooperative with the movement of the piston valve for controlling the admission of the diluting fluid. However, the arrangement shown provides simplicity in construction with accurate control in the opening and closing of the secondary valves. Thus while I have set forth the preferred form of my present invention, nevertheless, it will be understood that variations or modifications therein may be made within the scope of the following claims.

Having described my invention, I claim:

1. A valve for dispensing fluids in measured quantities, comprising a casing having an open ended valve chamber, an inlet for admitting fluid into said chamber, a movable valve member mounted in said chamber, said valve member being formed with outer and intermediate heads, the intermediate head being spaced from the outer heads to provide a pair of annular grooves, manually operated means disposed exteriorly of said casing for imparting sliding movement to said valve member, and a pair of spaced fluid outlets provided in said casing, said outlets being arranged on opposite sides of said inlet, the relative spacing of said inlet, outlets and grooves being such that when one of said grooves is in registration with said inlet to cause a filling thereof with a fluid undergoing measured dispensing, the other of said grooves occupies a position of registration with one of said outlets, and, when the valve member is moved to bring the fluid-filled groove into registration with the other of said outlets, the second groove will occupy a position in registration with said inlet means and out of registration with either of said outlets.

2. A valve for dispensing fluids in measured quantities, comprising a casing having a valve chamber, a primary fluid inlet for admitting fluid into said chamber, a slidably movable valve member mounted in said chamber, said valve member embodying an intermediate head and a pair of outer heads, the intermediate head being spaced from the outer heads to produce a pair of spaced annular grooves, a pair of spaced fluid outlets provided in said casing on opposite sides of said primary inlet, a pair of secondary inlets provided in said casing on opposite sides of said primary inlet, a normally closed valve for each of said secondary fluid inlets, said last-named valves being provided with operating stems projecting into said valve chamber, means on the intermediate head of said valve member for engaging said stems to unseat the valves in said secondary fluid inlets, and means disposed exteriorly of said casing and connected with said valve member for imparting reciprocatory motion thereto, the spacing of the grooves in said valve member being such that when one of said grooves is in registration with said primary fluid inlet means, the same will be out of registration with either of said outlets and the other of said grooves will occupy a position of registration with one of said secondary fluid inlets unseating the valve therein and providing for fluid flow through the registering outlet.

3. A valve for dispensing fluids in measured quantities comprising a casing having a valve chamber, a centrally disposed primary fluid inlet entering said chamber, a spool valve slidably mounted in said chamber, said valve comprising rigidly united intermediate and outer heads, the intermediate head being spaced from the outer heads to form a pair of annular grooves, and the end portions of said intermediate head being chamfered to provide tapering surfaces, a pair of spaced fluid outlets provided in said casing on the opposite side of the latter as regards said primary inlet, a pair of spaced secondary fluid inlets on the same side of said casing as said primary inlet, said secondary inlets being arranged diametrically opposite said outlets, a normally seated valve arranged in each of said secondary inlets for precluding fluid flow therethrough, each of said normally seated valves having a stem projecting into the confines of said valve chamber for engagement with the chamfered surfaces of the intermediate head of said spool valves, the outer heads of said spool valve being formed with recesses for the reception of the ends of said valve stems, and means connected with said spool valve and disposed exteriorly of said casing for imparting sliding movement thereto, the spacing of the grooves of said spool valve being such that when one of said grooves is in registration with said primary fluid inlet, it will be out of registration with either of said outlets, and the other of said grooves will be positioned in registration with one of said outlets and one of said secondary fluid inlets, causing the unseating of the valve in the registering secondary fluid inlet to provide for fluid flow through the registering outlet.

4. A measuring valve for dispensing fluids, a casing having a valve chamber, an inlet for admitting fluid into said chamber, a movable valve member slidably mounted in said chamber, said member comprising a longitudinally split body forming duplicate halves, a strip of resilient material positioned between the valve body halves and tending upon compression to impart separating forces to said halves, means for restraining said halves against relative longitudinal displacement when the same are confined in said valve chamber, said body halves serving, when assembled, to form intermediate and outer heads having spaced annular grooves provided therebetween, a pair of spaced outlets formed in said casing and disposed on opposite sides of said inlet, and manually operated means disposed exteriorly of said casing and joined with said valve member for imparting sliding motion thereto, the spacing of said grooves in said valve member being such that when one of said grooves is in registration with said fluid inlet to admit of the flow of a measured amount of the fluid into the groove, the other of said grooves will be in fluid-discharging registration with one of said outlets.

5. Valve mechanism for dispensing fluids in measured quantities comprising a casing having a valve chamber, a primary fluid inlet for admitting fluid into said chamber, a slidably movable valve member movable in said chamber, said valve member embodying an intermediate head and a pair of outer heads, the intermediate head being spaced from the outer heads to provide a pair of spaced annular grooves, a pair of spaced fluid outlets provided in said casing on opposite sides of said primary inlet, means disposed exteriorly of said casing for reciprocating said valve member, the spacing of said grooves in said valve member being such that when one of the grooves is in registration with said primary inlet and out of registration with either of said outlets, the other of said grooves will be disposed in registration with one of said outlets, and secondary fluid inlets for admixing a diluting fluid with the fluid undergoing discharge through either of said outlets.

6. Valve mechanism for dispensing fluids in measured quantities comprising a casing having a valve chamber, a primary fluid inlet for admitting fluid into said chamber, a slidably movable valve member movable in said chamber, said valve member embodying an intermediate head and a pair of outer heads, the intermediate head being spaced from the outer heads to provide a pair of spaced annular grooves, a pair of spaced fluid outlets provided in said casing on opposite sides of said primary inlet, means disposed exteriorly of said casing for reciprocating said valve member, the spacing of said grooves in said valve member being such that when one of the grooves is in registration with said primary inlet and out of registration with either of said outlets, the other of said grooves will be disposed in registration with one of said outlets, secondary fluid inlets for admixing a diluting fluid with the fluid undergoing discharge through either of said outlets, and means synchronized with the movement of the movable valve member for controlling the operation of the secondary fluid inlets.

7. A measuring valve for dispensing flavored carbonated beverages, comprising a casing formed with a valve chamber, said casing including an inlet for a flavoring syrup, a pair of carbonated water inlets formed in said casing, the latter inlets being disposed on opposite sides of the syrup inlet, and a mixed fluid outlet formed with said casing on the opposite side thereof as regards said inlets, normally closed spring-pressed valves positioned in said carbonated water inlets, said valves being provided with actuating extremities projecting into said chamber, a main valve member movably mounted in said chamber, said valve member being formed with a centrally disposed head providing on opposite sides thereof a pair of spaced measuring chambers, the peripheral portion of said head being engageable with the actuating extremities of said spring-pressed valves to unseat the latter, and manually operated means disposed exteriorly of said casing for operating said valve member to position the same in one or the other of two operating positions, said valve member when in one operating position providing for a measured flow of syrup from said syrup inlet into one of said measuring chambers and the retention of the syrup on said latter chamber by the positioning of the latter so that it is out of registration with said outlet and locating the other of said chambers in fluid flow communication with said outlet, the spring-pressed valve in registration with the chamber in open communication with said outlet being unseated by the engagement of the peripheral portion of said head with the actuating extremity of the latter valve.

LESLIE R. TANSLEY.

REFERENCES CITED

The following references are of record in the file of this patent:

UNITED STATES PATENTS

| Number | Name | Date |
|---|---|---|
| 1,189,578 | Kelly | July 4, 1916 |
| 1,286,881 | Gray | Dec. 8, 1918 |
| 1,473,187 | Kaefer | Nov. 6, 1923 |